July 2, 1940.                H. JACOBIUS                2,206,282
              METHOD AND MEANS FOR TESTING SUGAR
                       Filed May 24, 1938

*Indicates Sugar
By Yellow Color
After Heating*

INVENTOR.
Herman Jacobius
BY Robert V. Morse
                                                ATTORNEY.

Patented July 2, 1940

2,206,282

UNITED STATES PATENT OFFICE 2,206,282

METHOD AND MEANS FOR TESTING SUGAR

Herman Jacobius, New York, N. Y.

Application May 24, 1938, Serial No. 209,697

6 Claims. (Cl. 23—230)

This invention relates to means for testing the presence of sugar in liquids generally and is also particularly adapted to detecting sugars in physiological liquids, such as the urine. The common tests, involving the heating of liquids, require test tubes or other laboratory apparatus and technique, and are inconvenient to perform at the bedside or in the ordinary household. The ordinary patient requires such tests frequently, and it is therefore desirable to provide means whereby such tests can be easily carried out.

The objects of the present invention are to provide a simple and practical test than can be performed anywhere without laboratory apparatus; to reduce the cost of such tests; to provide a permanent record of the determinations, and various other objects will become apparent as the description proceeds.

Figure 1:
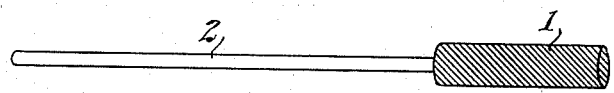

Referring now to the drawing, Fig. 1 is a perspective view of an illustrative form of test material, before use, the cross-hatching indicating a pale green tint according to Patent Office conventions.

Figure 2:
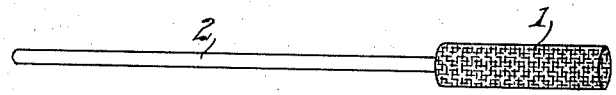

Fig. 2 is a similar view of the test material, after use, and after being heated, the double cross-hatching indicating a yellow or orange color, according to Patent Office conventions.

The ordinary laboratory tests at present in use employ Benedict's solution and the tests are carried thru in liquid form. The present invention also uses Benedict's solution, but the tests can be carried out in dry form; and, by the application of a moderate amount of heat, give definite and quite precise color indications.

One simple illustrative method of preparing the test material as shown on the accompanying drawing, is as follows: asbestos sheets about $\frac{1}{32}$ of an inch in thickness are soaked in Benedict's qualitative solution for a period of twenty-four hours. The asbestos is then removed from the solution and strips about an inch wide and say two inches long are cut out from the soaked asbestos paper and rolled on the ends of wooden sticks or applicators, and then allowed to dry in air. The asbestos when wet is rather pulpy and plastic, but on drying becomes hard, so as to retain its form.

In the accompanying drawing the dried asbestos, after being treated as described, is indicated by the reference numeral 1, and it is shown attached to a wooden stick or applicator 2. The color is usually a pale blueish-green, but may vary somewhat according to the materials used.

The devices when dried can be readily carried about or shipped, and retain their sensitivity for a long time. When it is desired to make a test for sugar in the urine for example, it is only necessary to apply a small quantity of the fluid to be tested to the treated asbestos, and then heat the same. A yellow color varying in intensity according to the concentration of sugar will then result.

In experiments to test the sensitivity and precision of the method, applicators were made as above described, and graded concentrations of glucose in normal urine were prepared, running from 5% down to 1%, and then in closer spaced samples of 0.6%, 0.3%, 0.2%, 0.15%, 0.1%, and 0.07%. The samples were then tested by adding two drops of the sample to the asbestos on the applicator and it was then heated over a Bunsen flame. A yellow color varying in intensity according to the concentration of sugar was observed on the treated material, with the exception of the 0.07% concentration, where no definite yellow color was detected. The highest concentrations were orange in color. Those ranging from 1.25% to 0.3% were yellow in color and the 0.15% and 0.1% concentrations gave a greenish yellow color on the asbestos applicators, which normally had a somewhat greenish hue. At no time did various specimens of normal urine give a yellow color.

Any source of heat that does not deposit soot on the surface of the applicators may be used, such as a Bunsen flame, stove range, alcohol lamp, electric heat, etc. It is important to avoid the direct heat of the flame to prevent charring.

These devices are very inexpensive, and can be conveniently carried by a physician or by the patent. By applying two drops of the patient's urine and heating it, one is able to determine the approximate concentration of sugar within one minute of time. The determination is substantially permanent, and the test results may be retained for record purposes if desired.

One of the simplest and cheapest forms of the device has been described, but it is understood that the asbestos, so far as known, has no chemical reaction during the test, but merely holds the active materials, so that any other refractory material that would not discolor might be used; and of course metal or other suitable material might be used in place of the wooden stick illustrated, which has been selected merely because of its cheapness.

While I have in the foregoing described certain specific examples, it will be understood that they are merely for purposes of illustration to make clear the principles of the invention, which is not limited to the particular form shown, but is susceptible to various modifications and adaptations in different applications as will be apparent to those skilled in the art, without departing from the scope of the invention as stated in the following claims.

I claim:

1. The method of detecting the presence of sugar in a solution which consists in drying Benedict's solution on an impregnated inert heat resisting material, then applying a sample of the solution to be tested to the dried material, and subjecting it to heat, whereby the presence of sugar is indicated by the development of a yellow color on the material when so heated.

2. The method of detecting the presence of sugar in a solution which consists in soaking asbestos in Benedict's solution, drying it, and then applying a sample of the solution to be tested to the dried material, and subjecting it to heat, whereby the presence of sugar is indicated by the development of a yellow color on the material when so heated.

3. The method of preparing test indicators for detecting the presence of sugar in solution which consists in soaking an inert heat resisting material in Benedict's solution, and then drying the same, whereby a product is produced capable of having a yellow color reaction in the presence of a sugar solution when exposed to heat.

4. The method of preparing test indicators for detecting the presence of sugar in solution which consists in soaking asbestos in Benedict's solution, and then drying the same, whereby a product is produced capable of having a yellow color reaction in the presence of a sugar solution when exposed to heat.

5. Means for detecting the presence of sugar in solution, comprising the combination of inert heat resisting material soaked in Benedict's solution and dried, whereby an indicating material is produced capable of changing to a yellow color in the presence of a sugar solution when exposed to heat.

6. Means for detecting the presence of sugar in solution, comprising the combination of asbestos soaked in Benedict's solution and dried, whereby an indicating material is produced capable of changing to a yellow color in the presence of a sugar solution when exposed to heat.

HERMAN JACOBIUS.